Jan. 16, 1934.    A. S. DWIGHT    1,943,858

CELLULAR MATERIAL AND METHOD OF MANUFACTURING SAME

Filed Jan. 10, 1931

INVENTOR.
Arthur S. Dwight
BY Austin + Dip
ATTORNEYS.

Patented Jan. 16, 1934

1,943,858

UNITED STATES PATENT OFFICE 1,943,858

CELLULAR MATERIAL AND METHOD OF MANUFACTURING SAME

Arthur S. Dwight, Great Neck, N. Y., assignor to Dwight & Lloyd Sintering Company, Inc., New York, N. Y., a corporation of Delaware Application January 10, 1931. Serial No. 507,901

2 Claims. (Cl. 91—70)

This invention relates to a light cellular product having an adherent surface coating and to a method of manufacturing the same.

In the manufacture of certain classes of concrete, where minimum weight is desired, it has been proposed to use a light cellular, pumice-like aggregate material. For example, a material described in the patent to Lloyd, No. 1,746,860, dated Feb. 11, 1930. Said material is made by treating ashes or clay on a particular type of heat treating machine to form a sinter cake which can be crushed and screened into various selected sizes of particles. These particles are porous and light, being composed of thin walled cells, cavities or pores having a great proportion of voids which render the apparent specific gravity so low that the resultant concrete is much lighter than that made with ordinary aggregate materials. In using this lighter aggregate, however, it has been found that, while the wet concrete mixture is being prepared, the cement of the mixture works into the cavities of the individual particles to a marked degree, filling those near the surface and even penetrating through the intercommunicating cells into those toward the center of the particle. In consequence of this partial filling of the cells or cavities, the finished concrete is heavier than would otherwise be the case and, owing to the quantity of cement lost in the cavities, excessive amounts thereof are required with consequent increase in cost of the finished produce.

It will be apparent that it is desirable to have the broken surface cells filled with cement inasmuch as this insures a firm bonding of the concrete. It is desired, however, to prevent the cement from working past the surface cells into the inner pores of the particles.

In accordance with the present invention, this penetration of the cement is prevented by applying to the surface of the cellular particles a coating or glaze which is capable of sealing to a large extent the intercommunicating passages or pores and preventing the cement from penetrating the same when the aggregate is used in a concrete mixture. Preferably, this coating or glazing should adhere firmly to the surface of the particles and not be merely loosely adherent or easily detached. This may be accomplished by dusting the surface of the particles with a small amount of flux material and heating the coated particles to form a compound which will cover and seal the pores. For example, sintered particles of clay, ash or like substances may be coated with fine salt, low melting point silicates or other flux material which will react with the surface of the particles at temperatures below their softening point to produce a slag or enamel which seals the cell passages, or a coating material may be used which, at a suitable operating temperature, is itself somewhat fluid or capable of fritting independently of any chemical reaction of the particle to be coated and which consequently will seal the pores. It will be understood that various coating materials may be selected for different types of particles depending upon the chemical composition of the latter.

The coating material may be applied by sprinkling the same in the dry state on the surface of the particles to be coated (which may be moistened if desired), or by spraying the particles with a solution thereof. The coating material may also be applied as a slurry or sludge, or in other known ways depending on the easiest method of handling, care being taken to apply it in suitable limited amounts, so that while the surface of the particle is coated, the interior pores and cells shall not be filled and the desired object thereby be defeated.

After the surface coating material has been applied, the particles may be heated to a suitable temperature so that the coating material will adhere firmly to the outer surface of the particle. Preferably, this heating operation should be so conducted that all the particles will be treated with substantial uniformity. Furthermore, while the temperature may be sufficient to accomplish the desired result, it is necessary to avoid excessive temperatures which would result in fusing the thin walls of the particles and destroying the cellular character. When, as is frequently the case, the particles are of comparatively small size, say, less than 1 inch, it is difficult to fulfill these requirements with ordinary methods of heating and at the same time secure sufficient output to make possible economical operation. With the method described herein, however, the operation may be carried on efficiently and economically with rapid and uniform treatment of the material with control of temperature and with large output.

A suitable apparatus in which the present process may be carried on is shown in the accompanying drawing in which Fig. 1 is a side elevation of a heat treating machine;

Like reference characters denote like parts in the several figures of the drawing.

Figure 1:
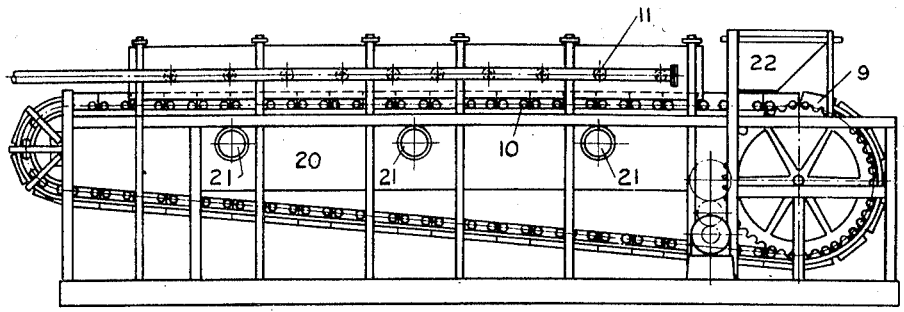
Figure 2:
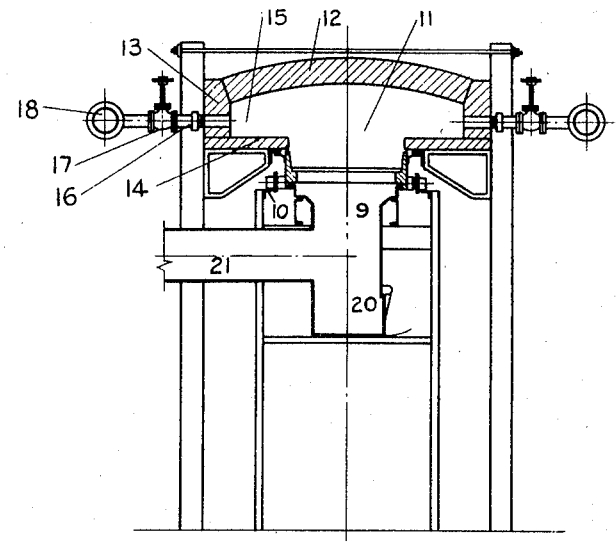
Fig. 2 is a sectional view thereof taken on the line 2—2 of Fig. 1.

In the following description and in the claims various details will be identified by specific names for convenience, but they are intended to be as generic in their application as the art will permit.

Referring to the drawing more in detail the invention is shown as applied to a heat treating machine comprising a plurality of pallets 9 having perforate bottoms and being supported on a suitable trackway 10 and adapted to be passed through a heating chamber 11, formed by top 12, sides 13 and bottom 14 of refractory material. Said chamber overhangs the pallets on both sides to provide a space 15 out of contact with the pallets which permits the gases to be heated before they are applied to the charge and assists in securing an even distribution of gases over the surface of the charge. The gases are introduced by a plurality of burners 16 which are preferably passed through side walls 13 and enter space 15. Said burners are controlled by valves 17 and receive fuel, such as gas or oil, from header 18.

Wind box 20 is mounted beneath the perforate bottoms of said pallets in a position to cooperate with the entire under surface thereof and communicates with a discharge pipe 21 through which the gases are withdrawn.

Figure 3:
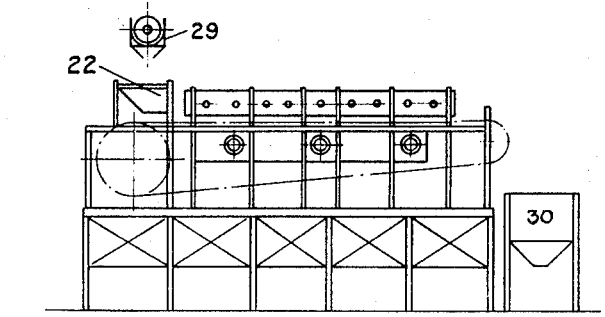
Fig. 3 is a diagrammatic view of a hopper arrangement for applying the various materials to the heat treating machine.

The apparatus illustrated in Fig. 3 comprises a pair of hoppers 25 and 26 which are adapted to receive certain constituents of the charge as will be hereinafter pointed out. The material is discharged from said hoppers as by traveling belts 27 and 28 and is applied to a mixing apparatus 29 of any desired form where the ingredients from the two hoppers are thoroughly mixed and then applied to hopper 22. Said last mentioned hopper 22 is positioned over pallets 9 and is adapted to apply a charge thereto prior to passage of said pallets through the heating chamber 11. It is obvious that after the pallets are passed through said chamber they may discharge their contents into a suitable receptacle 30.

In carrying on the present process in the above described apparatus the material to be coated, for example sintered clay or ash, which is preferably in small particles and may have its surface moist, is stored in a hopper, such as hopper 25, and the coating material, such as salt which may be stored in hopper 26. These materials are then applied to a mixing machine 29 wherein the materials are thoroughly mixed. It is obvious that the excess of the coating material may be removed in any suitable manner and returned to its storage bin. The mixture is then fed to hopper 22 and applied to the pallets in the form of a thin permeable layer which is passed through the heating chamber and heated therein to the necessary temperature to cause the coating to adhere permanently to the surface of the particles. The heating is accomplished by the hot gases supplied from burners 16 which are drawn downwardly through the entire bed of material into wind box 20 and discharged through pipe 21.

It is obvious that the temperature of the gases and the time during which the material is held in the heating chamber may be regulated to effect the desired reactions. The finished product is then discharged into a storage hopper and is ready for use.

It is to be understood that any desired fuel may be employed and that in case relatively low temperatures are required the waste gases from other operations, such as boiler gases, may be used. In certain instances where particular effects are desired, such as a reducing atmosphere or a chemical reaction, the suitable gases heated in any desired way, may be supplied to the chamber instead of the burner gases described above.

The invention has been described as applied to cellular aggregate, formed of sintered clay or ash, and coated with salt or other fluxing material by way of illustration only. It may also be applied to many other materials, for example, small sized lime particles may be coated with iron ore dust in order to prevent abrasion and dusting of the lime particles and to reduce the tendency of the lime to hydrate or slake in storage. For this purpose small sized limestone is wetted and mixed with iron ore dust to coat the surface thereof and is then charged onto the pallets and burned to lime by drawing hot burner gases through the bed in a manner to be described. This operation not only burns the limestone, but causes the iron ore dust to adhere firmly to the surface thereof.

It will also be obvious that the process may be applied to the coating of various other materials, preferably in small sizes, inasmuch as the passage of the hot gases through a pervious layer of the material is particularly adapted to uniformly heat the surface of the particles and to apply a uniform coating to the various particles throughout the entire layer of material.

While certain novel features of the invention have been disclosed and are pointed out in the annexed claims, it will be understood that various omissions, substitutions and changes may be made by those skilled in the art without departing from the spirit of the invention.

What is claimed is:

1. The method of coating the surfaces of cellular particles to seal the same which comprises coating the surfaces of the particles with a coating material having a melting point below that of the cellular particles, spreading the coated particles in a thin pervious layer on a pervious support, passing through a furnace chamber said support with said layer in a quiescent state thereon, passing hot gases directly through said support and said layer transverse to the planes thereof, the layer moving at such rate and being subjected to such temperature to cause the coating material to melt, flow over and fuse to the surfaces of the particles, and removing the particles from the furnace before appreciably melting the particles themselves, whereby a thin coating is applied to the surfaces of the particles without filling the interior voids.

2. The process of forming a cellular aggregate for concrete and the like comprising a burnt clay product having microscopic voids and a thin coating which seals the outer cells of the particles without filling the interior voids which comprises mixing the cellular particles with a coating material having a lower melting point than that of the particles, forming the resultant mixture in a thin permeable bed and moving said bed through a heating chamber while drawing hot gases therethrough thereby causing the coating material to melt and seal the outer cells of the particles.

ARTHUR S. DWIGHT.